March 17, 1970    W. R. P. DELANO    3,501,381
SOLAR STILL WITH FLOATING SLAB-SUPPORTING
PARTICULATE RADIANT ENERGY RECEPTOR
Filed Jan. 18, 1967                                        2 Sheets-Sheet 1

INVENTOR.
WILLIAM R. P. DE LANO

March 17, 1970  W. R. P. DELANO  3,501,381
SOLAR STILL WITH FLOATING SLAB-SUPPORTING
PARTICULATE RADIANT ENERGY RECEPTOR
Filed Jan. 18, 1967  2 Sheets-Sheet 2

INVENTOR.

WILLIAM R.P. DELANO

BY Daniel M. Schaeffer
        agent

United States Patent Office 3,501,381
Patented Mar. 17, 1970

3,501,381
SOLAR STILL WITH FLOATING SLAB-SUPPORTING PARTICULATE RADIANT ENERGY RECEPTOR
William R. P. Delano, P.O. Box 96,
Setauket, N.Y. 11785
Filed Jan. 18, 1967, Ser. No. 616,997
Int. Cl. C02b 1/08, 1/06; B01d 3/00
U.S. Cl. 202—83          11 Claims

ABSTRACT OF THE DISCLOSURE

A greenhouse type solar still which can be floated in brine has sidewalls enclosing a surface area of the brine. Floating slabs insulate the enclosed area and support a wettable evaporator radiant energy receptor. Spaced passages in each slab which are filled with capillary active material interconnect the evaporator and the brine to supply fresh brine for complete wetting of the evaporator and to provide sufficient back flow of brine concentrated in the evaporator to prevent salt formation while minimizing heat losses.

---

This invention relates to solar distillation, to greenhouse type solar stills, and more particularly to a non-salting solar still having an evaporator-heat receptor supernatant upon, while substantially thermally insulated from, a bulk brine and supplied with brine by means providing back flow of concentrated brine.

The greenhouse type solar still which are evolved in the art as a preferred type has a transparent canopy which functions as a roof for an enclosed volume, as a window to admit radiant solar energy which provides the heat necessary for evaporation of vapors from the contained brine, and as a condenser for these vapors. A heat receptor, generally black, is needed for efficient conversion of the incident actinic and short wavelength components of solar radiation into the longer wavelengths which heat the brine. After the still has been in operation for some time salt deposition from the concentrated brine changes the black-body characteristics of the heat receptor necessitating interruption of the operation of the still so that the heat receptor surface may be cleaned of salt deposits to assure efficient operation of the still.

A method which avoids this salting problem uses as a heat receptor a nonwoven mat of black fibrous material floating on the the surface of the brine. The mat is so constructed that salt forming on the fibers falls through the mat and does not change its coloration.

In addition to the salting problem, there is the problem of thermal inefficiency caused by the need to heat an appreciable mass of brine before evaporation ensues. Even when operating with a shallow pool of brine, as is recognized in the art, the energy needed to raise the temperature of the bulk of the brine to the evaporation point is largely wasted. One way to avoid this waste is to minimize the amount of brine in contact with the heat receptor and to heat only this minimal amount of brine. This is done in one type of still by having an elevated evaporator-heat receptor supplied with brine from a shaded brine trough through elongated wicks. In another still the same result is attained by supporting absorbent mats on floats themally insulating the mats from the brine. The absorbent mats which act as an evaporator-heat receptor are provided with brine by wicking means. In both types of still salting is a problem and means are provided which permit periodic desalting of the evaporator-heat receptor by raising the brine level to flood and flush clean the evaporator surface.

Now, I have discovered how to prevent salting while preserving high thermal efficiency by the provision of means for establishing a counterflow circulation of brine between an insulated brine pool and an evaporating means wetted by said brine to return concentrated brine to said pool while maintaining all of the said evaporating means thoroughly wetted with brine during operation of the still.

In the practice of my invention I provide wall means surmounted by a radiant energy-transparent canopy condenser surface for enclosing a volume and forming a liquid seal with a pool of brine having a free surface within and delimited by the said wall means. The pool of brine may have any depth, and, since a shallow depth is not necessary, the contour and level of the bottom below the pool is a matter of indifference eliminating need for exact and costly leveling. On the said free surface I float buoyant thermally insulating slabs of material inert to the brine so as to overlay substantially all of the said free surface enclosed by the said wall means. Each of the buoyant thermally insulating slabs has a plurality of passages at spaced apart interavls interconnecting the upper and lower surfaces thereof. Each of the passages contains a filling of a capillary active material adapted to the elevation and transport of brine. Supported on the upper surface of each of the slabs and in contact with the passage filling material is an extended area capillary active material, preferably dark in color, which is wettable by the brine and which serves the dual function of evaporator and heat receptor. The cross-sectional area of the passage, the pasage filling material, the thickness of the insulating slab, and the thickness of the evaporator-heat receptor are selected in combination so as to permit uniform wetting of the entire evaporator-heat receptor without salting at the maximum distillation rate of the still while at the same time minimizing heat loss to the pool of brine.

This invention is predicated on the discovery that the more concentrated brine formed in the bulk of the evaporator-heat receptor will tend to flow to a nearby passage and will actually flow downward through the mass of the passage filling material while less concentrated brine is being transported upward from the brine pool through the passage filling material by capillary action. When the cross-sectional area of each passage and the spacing between next-neighbor passages is in the proper proportion for a given passage filling material and a particular evaporator-heat receptor material the entire evaporator-heat receptor will remain thoroughly wetted at the maximum distillation rate of the still. When a brine-soluble dye is added to the brine concentrating on the evaporator-heat receptor, the counterflow of concentrated brine can be observed as isolated filamentous streams of color emerging from the lower end of the passage in the brine pool.

Although the reason for this countercurrent flow of fluid in the capillary active filling material is not fully understood it is believed that the flow is associated with the density differences of the two streams and is sufficiently slow that there is little or no turbulent mixing between adjacent streams in the capillary channels of the filling material. It is postulated that there may be an actual exchange of heat between the rising and descending streams. Such heat exchange would serve to heat the less dense rising stream and cool the more dense descending stream and add additional impetus to their separation while minimizing heat losses even further.

Based on this reasoning the thickness of the evaporator-heat receptor in the vertical direction must be sufficient to permit the establishment of a density gradient which will provide the driving force for the horizontal countercurrent flow therein.

It will be apparent to one skilled in the art that there is some theoretical distance that a water or other liquid molecule can be transported by capillary action alone from the lower surface of the slab through a passage to a maximum distant point in the evaporator-heat receptor. The maximum distance is a function of the relative capillarity of the passage filling material as well as the relative capillarity of the evaporator-heat receptor material. For this reason the determination of passage cross-sectional area and spacing between next-neighbor passages is made by simple experimentation as will be explained hereinafter.

For reasons of economy the thickness of the insulating slab is selected as the minimum that will provide the needed insulation while at the same time being sufficiently rigid to support above the pool surface the entire mass of the evaporator-heat receptor when completely soaked with brine.

It is thus a first object of this invention to provide a nonsalting solar still.

Another object of this invention is to provide a nonsalting solar still of increased thermal efficiency.

A still further object of this invention is to provide a floating solar still in which the bulk brine is insulated from thermal effects.

An additional object of this invention is to provide a nonsalting heat receptor for a solar still.

An additional object of this invention is to provide a nonsalting heat receptor which is thermally insulated from a pool of bulk brine.

An additional object of this invention is to provide a capillary active means for wetting an evaporator-heat receptor while preventing salt deposition thereon.

An additional object of this invention is to provide means for establishing counterflow circulation of brine between a pool of brine and an evaporator-heat receptor during operation of a solar still.

For a better and more complete understanding of the invention and how these and other objects of this invention can be most readily attained, reference is made to the following description as illustrated by the drawings accompanying and constituting a part of this specification. It is to be understood that the somewhat schematic drawings are not intended as a definition of the invention but are only for the purpose of illustrating the preferred embodiments as required by statute.

In the drawings:

FIGURE 2 is a cross-sectional elevation of a floating embodiment of this invention adapted to use in the saline waters of bays, estuaries, lagoons and the like;

FIGURE 2a is a perspective view showing the bottom of the wall members of the embodiment of FIGURE 2 and illustrating more clearly the arrangement of cross-tie members;

Figure 1:
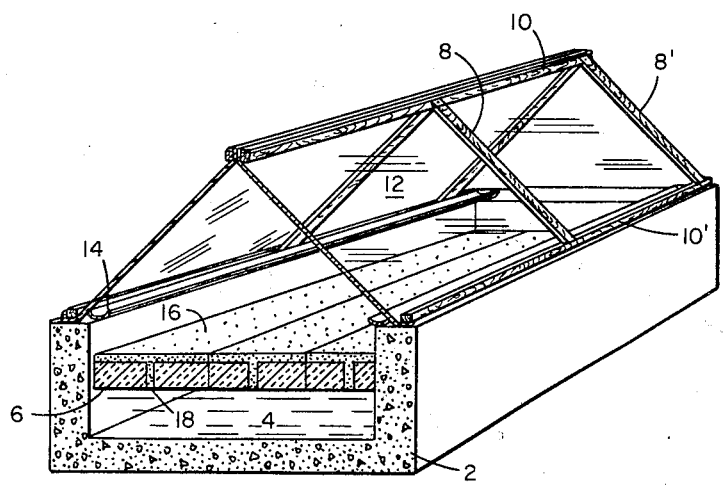
FIGURE 1 is a partially cutaway perspective view of a preferred embodiment of this invention adapted to use on land.

Referring now to FIGURE 1 which illustrates a preferred embodiment of this invention adapted to use on land, reference symbol 2 refers to a trough-like container adapted to form a pool of brine 4. Brine is fed to and removed from container 2 by means not shown of a type familiar to those skilled in the art at rates adjusted to prevent salting in the pool of brine 4 as would result from exceeding the solubility limit of the solids dissolved in and comprising the brine. It is within the scope of this invention to supply brine either in a continuous or in an intermittent fashion, since the depth of the pool of brine 4 in container 2 is not critical and can be permitted to vary. Similarly, the bottom of container 2 need not be level provided there is sufficient brine in pool 4 to float buoyant insulating slabs 6 free of contact with the bottom of container 2.

Container 2 can be made of any material conveniently available which will hold the brine. Since the pool of brine 4 within container 2 is not heated to any significant extent, the amount of brine withdrawn or lost through leakage is not critical with regard to thermal efficiency. An economic balance can be made between the costs of container 2, when constructed of one or another material, and the costs of supplying additional brine to make up for the leakage resulting from the use of the material. In most cases leakage can be tolerated; in fact, it will be economically advantageous where a lower cost material is used. Thus, a construction material for container 2 can be chosen on the basis of minimum overall costs. Concrete, wood, plastic, tile, rammed earth, clay, and brick, either alone or in combustion with plastic and bitumen liners can be used as construction materials for container 2. Since it is economic and convenient to prepare buoyant insulating slabs 6 in standard modules, the dimensions of container 2 are most advantageously chosen to be an integral measure of the dimensions of one of buoyant slabs 6.

Sufficient buoyant insulating slabs 6 are provided to substantially cover the entire free surface of the pool of brine 4 within the side wall members of container 2. Buoyant slabs 6 are of a material which is a good thermal insulator and which is generally inert and impervious to the brine. A convenient material for slabs 6 is polystyrene foam of the type having non-interconnecting voids. This material is preferred for use with aqueous saline brine and is satisfactory for use with many other types of brine distilland. It should be understood that other plastic materials having the desired buoyancy, rigidity, and thermal insulation properties can also be used, and even natural products such as wood and cork can be used if treated, as is known in the art, by impregnation and coating to prevent absorption of brine.

Surmounting container 2, and forming a seal therewith along the top of the wall members of container 2, is a canopy having support members 8, 8', 10, and 10'. With this construction the canopy can be made inexpensively and the glazing fastened to the support members and the support members to each other with nails. Glazing 12 is substantially transparent to radiant solar energy. In the embodiment illustrated in FIGURE 1, polyvinyl chloride film is used for glazing 12 and redwood is used for support members 8, 8', 10, and 10'. It is within the scope of the invention, however, to use other materials of construction as availability and costs dictate. As is well known in the art, other film type glazing such as polyvinyl fluoride can be used as also the more rigid glazing such as glass, polymethylmethacrylate, and fiberglass laminated plastics. Some of these latter materials are structurally self-supporting and can be fastened to each other so as to eliminate the need for support members 8, 8', 10, and 10'. Additionally, the support members can be made of a variety of materials in various shapes and use other fastening methods known to those skilled in the art. It is also within the scope of this invention to provide a plastic film glazing having appropriately located integral cells which when inflated serve to support the canopy. The canopy can be removably supported on the wall members of container 2 as illustrated in FIGURE 1. As is well known in the art, the line of joinder between the canopy and the wall members of container 2 should be well sealed to be substantially airtight if a highly efficient solar still is to be realized.

Gutter means 14 for collecting distillate formed on the inner surface of the canopy and for conducting the distillate to storage means not shown is provided along the lower edges of the canopy and is supported by the wall members of container 2. Since condensation of vaporized distilland takes place primarily on the inner surface of glazing material 12, it is advantageous to treat the inner surface of glazing material 12 to make the surface wettable by the distillate if the surface is not naturally so wettable. Hydrophobic surfaces can be treated to promote wetting by water, using methods known to the art, as, for example, by treating with a solution of a colloidal metal oxide. Alternatively, treatment with hydrophilic surfactants can be used or the surfactant can be incorporated in the resin from which the glazing material is made.

Supported by and on the top surface of each of slabs 6 and covering the surface thereof is an evaporator-heat receptor 16 which converts incident radiant solar energy to heat and functions as an evaporating surface to vaporize brine wetted therewith. In each of slabs 6 is a plurality of vertical through passages, as shown, interconnecting the brine of pool 4 with the evaporator-heat receptor 16. Each passage 18 contains a capillary active filling material, to be described hereafter, which material provides brine from pool 4 to wet evaporator-heat receptor 16 and return concentrated brine by counterflow to brine pool 4. Although dark colored organic, inorganic, woven, and non-woven fibrous material and porous capillary active material can be used for the evaporator-heat receptor of this invention, for economic reasons I prefer to use a distributed layer of particulate matter which is wettable by the brine in pool 4. Almost any particulate matter which is wettable or which can be treated to make it wettable can be used. I have found that satisfactory particulate matter generally has a particle size distribution in which all of the material is smaller than 0.0232 inch and about fifty percent of the material is between 0.0117 and 0.0059 inch in the size of the smallest dimension, anisometric particulate material with an angular elongated shape being preferred. Examples of particulate matter in this particle size range which I have found to be satisfactory in the recovery of potable values from saline water, include sand from a glacial deposit, cinders, and hardwood charcoal. With light colored sand addition of a black pigment, such as fine carbon black, improves its properties as a heat receptor. Also, it has been found possible to incorporate powdered poison material, such as mercuric iodide, which is substantially insoluble in brine to supress animal and plant growth on the evaporator-heat receptor without adversely affecting the quality of the collected distillate.

When a layer of hardwood charcoal is used for the evaporator-heat receptor, the addition of a small quantity of wetting agent has been found useful to promote initial wetting by saline aqueous brine.

It is within the scope of this invention to use as particulate matter hydrophobic material. Such material can be surface treated to render it hydrophilic if desired by the methods previously described for the treatment of glazing material. The particulate matter can be treated before being spread on the slab surface or after forming the evaporator-heat receptor layer.

I have found that a layer of particulate matter about one-quarter of an inch in height provides an adequate volume for the practice of my invention. It is believed that this height permits the establishment of a concentration gradient in the concentrating brine sufficient to cause the formation of streams of different densities, which streams produce a countercurrent flow pattern in the evaporator-heat receptor 16 returning concentrated brine through passages 18 by counterflow therein to brine pool 4. The removal of concentrated brine from the evaporator-heat receptor by this mechanism is believed to be the reason for the non-salting property of this solar still.

Figure 2:
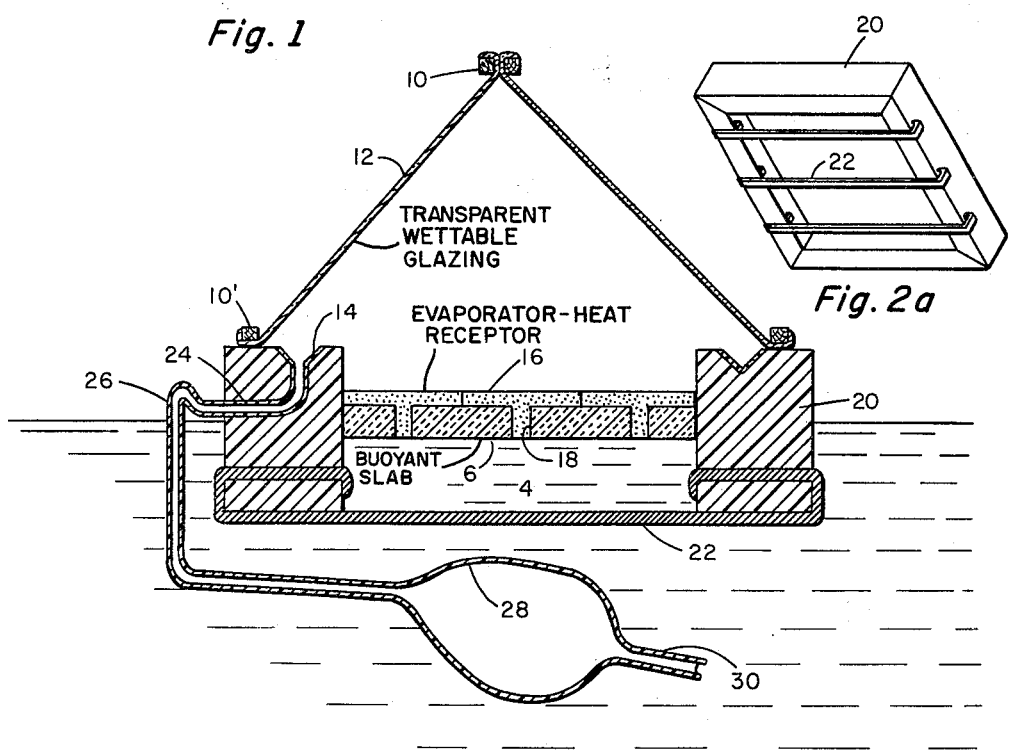

Referring now to FIGURE 2, which is a cross-sectional elevation drawing schematically illustrating a preferred embodiment of this invention adapted to flotation in saline waters, particularly the relatively sheltered waters of bays, estuaries and lagoons, with like numbered reference symbols of this drawing and the drawing of FIGURE 1 referring to corresponding like elements, wall members 20 of buoyant material support the canopy and form a water seal to isolate a surface area of brine defining a pool of brine 4 upon which evaporator-heat receptor 16 is buoyantly supported by thermally insulating slabs 6 having vertical through passages 18, each with a filling of capillary active material adapted to countercurrent flow of brine therethrough to wet evaporator-heat receptor 16 and return concentrated brine to pool 4.

Wall members 20 are joined by conventional means to form a rectangular enclosure open at the top and bottom. The rectangular enclosure can be of any convenient length and width, but preferably should have interior dimensions which are an integral multiple of the dimensions of commercially available slabs 6. Although conventional joining methods will provide a rigid structure of wall members 20 strong enough to withstand anticipated normal wind and wave conditions to be encountered in a relatively protected location, I believe it is prudent to provide a cross-tie structure 22 at intervals spaced in relationship to the length of slabs 6 and aligned at a right angle to the length of slabs 6, as illustrated. The arrangement of the cross-tie structure 22 is shown more advantageously in the drawing of FIGURE 2a.

Cross-tie structure 22 can consist of a plurality of metal rods each of which pass under the bottom of each of the spaced apart parallel wall members parallel to the length of slabs 6 and are bent upwards to follow the exterior surface of each wall member before bending through a right angle to pass inwardly through each wall member where a final right angle bend clinches the metal rod in rigid relationship to resist both tensile and compression forces.

Although the drawings illustrate the use of cross-tie structure 22 to reinforce only two sides of the rectangular arrangement of wall members, it will be obvious to one of normal skill in the art that this same reinforcement system can be used to provide a grid of rods to tie together all four wall members. It is within the scope of this invention to use as elements in a cross-tie structure plastic as well as metal rod, screening, netting and cable, employing appropriate fastening as indicated. Not only does an appropriate cross-tie structure add to the integrity of the structure but the cross-tie structure also facilitates dry-land transportation and launching of the solar still while supporting slabs 6 prior to launching.

Wall members 20 can be made of any buoyant material having suitable structural properties. I have found foamed polystyrene to be suitable. In the embodiment illustrated in FIGURE 2 gutter means 14 comprises an aluminum liner in a V-shaped support made integral with the top of wall member 20. Optionally, a plastic instead of the metallic liner can be used for gutter means 14, or, depending upon the structural material used for wall member 20, gutter means 14 can be provided as an integral part of wall member 20. It is not necessary to slope gutter means 14 with reference to a level since the entire floating solar still can be tilted to provide for distillate flow by gravity to any arbitrary location of distillate outlet 24 by hanging ballast, not shown, on wall member 20 at a point plumb with distillate outlet 24. Distillate outlet 24, in wall member 20, is shown connected with guide means 14 and flexible conduit means 26 for directing the flow of distillate, to distensible bladder 28 for intermittent storage of distillate. Storage bladder 28 of flexible plastic or equivalent material is preferably submerged in the brine in which the still floats, cooling the distillate to its temperature which is significantly below the temperature of the distillate as formed by condensation on the interior of glazing 12. This cooling is desirable when the distillate is used as drinking water. Although distensible bladder 28 is shown submerged at a point below the lower level of wall members 20, the location of bladder 28 is not critical and can be placed within the area defined by the wall members, occupying the space in the volume between the plane of the cross-tie structure structure and the bottom of slabs 6. Such arrangement makes a compact substantially stress-free structure which can be moved readily from one anchorage to another if desired. It will be obvious to one skilled in the art that bladder 28 must be restrained to avoid interference with the operability of passages 18. Distillate collected in distensible bladder 28 can be removed periodically, as by pumping by means not shown, through conduit 30 to a shore base or other location for storage or use. In the drawing the distant termination of conduit 30 is not shown. Since the production rate of distillate of solar stills working on sea water is about one tenth gallon per day for each square foot of evaporator surface area there is an obvious advantage in the use of a distensible bladder in combination with intermittent pumping to empty the bladder. Thus, a plurality of floating solar stills, each of a manageable size, can be serviced in turn with one pump.

Figure 3A:
FIGURE 3a is a cross-sectional elevation representing a portion of an insulating slab and illustrating a vertical through passage having a filling of fibrous material.
Figure 3B:
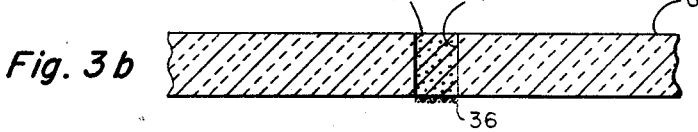
FIGURE 3b is a cross-sectional elevation of a portion of an insulating slab containing a vertical through passage having a filling of particulate material supported by a screen.
Figure 3C:
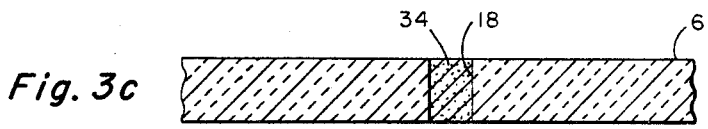
FIGURE 3c is a cross-sectional elevation of a portion of an insulating slab having a vertical through passage with a filling of particulate matter and a binder.

In FIGS. 3a, 3b, and 3c are shown several of the fillings of passage 18 which provide the capillary active means for establishing a counterflow of fresh brine from brine pool 4 and the return of concentrated brine from the evaporator-heater receptor 16. FIGURE 3a illustrates a fiber filling 32 in passage 18. Satisfactory fiber filling material includes nylon tow, asbestos, glass fiber rovings, and cellulose acetate parallel fiber filter material of the type used in certain brands of filter cigarettes. In FIGURE 3b is shown a particulate filling 34 supported by a screen 36 in the lower end of passage 18. Screen 34 can be made of plastic or of a metal inert to brine in brine pool 4. Particular filling material 34 is preferably the same material as that used for evaporator-heat receptor 16. FIGURE 3c illustrates a filling for passage 18 in which particulate material similar to that designated as 34 is mixed with a binder such as starch, partially hydrolysed polyvinyl acetate, and the like, to form a high solids content slurry with a putty-like consistency with which passage 18 can be filled. Upon drying and then being wetted with brine this filling exhibits satisfactory capillary action.

Figure 4:
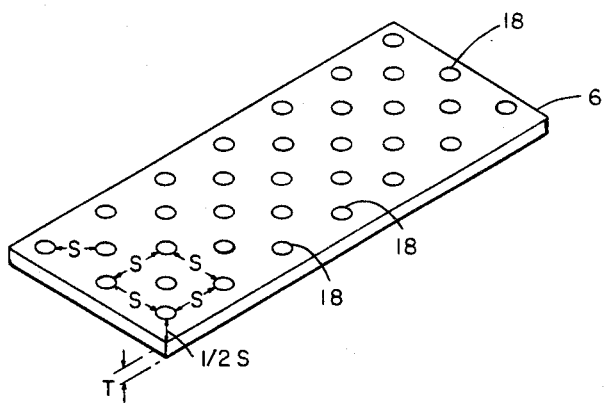
FIGURE 4 is an isometric view of an insulating slab showing a preferred arrangement of vertical through passages.

FIGURE 4 shows an arrangement of a simple equilateral triangular array of vertical passages 18 which has been found satisfactory in the operation of this invention. The spacing between next-neighbor passages 18, indicated as distance S, is uniform throughout the array. Passages adjacent the edges of slab 6 are generally closer to the edge than ½ S, since their spacing is governed by the requirement that the passage closest to a corner is no greater distance away from the said corner than ½ S. The uniform array of passages with each passage having the same cross-sectional area, as shown in FIGURE 4, is a preferred layout chosen for convenience in fabrication. It will be obvious to those skilled in the art to use other arrangements including those in which passage spacing and passage cross-sectional area are varied to provide the wetting and counterflow in accord with the teachings of this invention.

Dimension T is shown in FIGURE 4 to indicate the thickness of slab 6. This dimension should be as small as is consistent with the structural requirements and buoyancy of the material while providing the needed support and thermal insulation.

For the array illustrtaed in FIGURE 4, 3 inches is a satisfactory value for S when the passage cross-sectional area is about 0.2 square inch and the passage 18 have a filling of capillary active material of the type corresponding to the heretofore described cigarette filter material. Most materials suitable for the evaporator-heat receptor will operate satisfactorily with this arrangement of passages 18. Generally, one-half inch is a suitable dimension for T. For the heavier evaporator-heat receptors it may be necessary to increase this dimension to as much as an inch to provide flotation and stability using a slab of polystyrene of the type described. Optimum spacing between passages is attained when the evaporator-heat receptor remains wet without salt deposition at the maximum distillation rate of the still. A spacing closer than the optimum will result in reduced thermal efficiency.

I have found it advantageous to use an experimental method to determine the appropriate values for passage spacing and passage cross-sectional area. The method will become readily apparent to those skilled in the art from the following example.

EXAMPLE

Two 250-watt heating lamps having internal reflectors were mounted side by side to project their heat and light vertically downward at a distance of about twelve inches on to a test section of the evaporator-heat receptor of this invention floating in a basin of sea water from Long Island Sound. The sea water in the basin had a depth of about three inches and a rectangular surface area of about 8 inches by 12 inches. Automatic cycle timing was used to provide an appropriate lighted day and dark night cycle. According to the principles explained above and illustrated in FIGURE 4 an array of vertical right circular cylinder passages spaced 3 inches apart in an equilateral triangular lattice was made in a slab of closed-cell polystyrene ½ inch thick. In test section A the diameter of each passage 5/16 of an inch. In test section B the diameter was ½-inch. Each of the passages was provided with a filling of the appropriate diameter cylinder of a cellulose acetate parallel fiber filter material made according to the teachings of U.S. Patent No. 3,095,343, issued June 25, 1963. The upper surface of each slab was then covered with a ¼-inch uniform layer of particulate hardwood charcoal which had been previously wetted by treatment with water and a wetting agent, drained, and allowed to air dry. The size distribution of the charcoal as spread on the test slabs corresponded to that shown in Table I.

TABLE I.—U.S. STANDARD SIEVE SERIES

|  | Weight percent | Opening size, inches |
| --- | --- | --- |
| On 30 mesh | 0 | 0.0232 |
| On 50 mesh | 40 | 0.0117 |
| On 100 mesh | 50 | 0.0059 |
| Through 100 mesh | 10 |  |

The sea water used in all tests had an initial temperature of 68 degrees F. and a density of 3 degrees Baumé corresponding to a specific gravity of 1.0211.

When the slab supporting the evaporator-heat receptor was floated in the sea water the entire surface became thoroughly wetted in a few seconds in both tests.

The heating effect of the pair of heat lamps as used in this example is estimated to produce a heating effect about five times that experienced in certain parts of India during the summer months where the solar radiation intensity is about 2,000 B.t.u. per sq. ft. per day.

In test A after a few hours of illumination a white salt crust formed on the black evaporator-heat receptor surface in areas about midway between the passages. After a few hours without illumination the salt crust would disappear indicating dissolution, brought about I conclude by the slow counterflow of less concentrated brine from the basin.

In test B the evaporator-heat receptor surface remained free of salt deposit all day every day. After six hours of continuous illumination the temperature of the evaporator-heat receptor as measured with a liquid thermometer with its bulb inserted into the charcoal layer was 135 degrees F. The corresponding temperature measured in the sea water in the basin immediately below the floating slab was 80 degrees F. The density of a sample of the sea water taken from the basin at this time was 5 degrees Baumé, corresponding to a specific gravity of 1.0357. The density increase resulted from the evaporation of water and the return of more concentrated brine to the basin from the evaporator-heat receptor.

From these two tests I conclude that the optimum cross-sectional area of the passages for these conditions using the three-inch spacing is slightly less than 0.0196 square inch, corresponding to the ½-inch diameter passage.

Similar experiments with other combinations of materials established that ¼-inch thick felts of organic fibers, and similar thickness of reticulated foamed plastics were useful materials for the evaporator-heat receptor, and that a slab thickness of 1-inch works as well as a ½-inch slab thickness, although there appeared to be no difference in the insulating properties of the two as measured by the temperature of the sea water in the basin.

Although the description, the drawings, and the previous example have been directed to the discussion of embodiments of this invention in which the solar still employs a rectangular slab module, this should not be considered as limiting. It is within the scope of the invention to use other shapes to cover the brine pool. Also, the confined brine pool need not have a rectilinear shape but can be oval or circular with the canopy and wall members suitably adapted to accommodate to the selected shape.

Throughout this specification I have used the word brine generically as is known in the art to mean any solution of a solvent and a solid material soluble therein. I have similarly used the word salt broadly to mean the solid which comes out of solution when its solubility is exceeded, as by vaporization and evaporation of solvent.

With these definitions it should be understood that the foregoing disclosure relates only to preferred embodiments of the invention and that numerous modifications or alternations thereof may be made therein without departing from the spirit and the scope of the invention as set forth in the appended claim.

I claim:
1. In a solar still for evaporating brine in which incident radiant solar energy enters through a transparent canopy to heat and vaporize at least a portion of a bulk brine distilland contained therein while condensate is formed on the inner surface of said transparent canopy and collected therefrom, the improvement comprising:
  evaporator-heat receptor means comprising brine-wettable dark colored particulate matter for converting said incident radiant solar energy to heat and for evaporating said distilland;
  buoyant brine-impervious slab means for floating on and substantially covering the surface of the said brine distilland and supporting said evaporator-heat receptor means in substantially thermally insulating relationship with respect to said bulk brine distilland;
  and, a plurality of passage means comprising fibrous particulate filling material disposed in contact with said slab means and communicating with the said evaporator-heat receptor means and the said brine distilland, said particulate filling material comprising vertical interconnecting passageways for providing capillary action for (a) supplying distilland to said evaporator-heat receptor means sufficient to maintain said evaporator-heat receptor means completely wet during distillation and (b) providing sufficient countercurrent flow of concentrated brine to said bulk brine from said evaporator-heat receptor means to preclude salt deposition in said evaporator-heat receptor means.

2. The apparatus of claim 1 in which said evaporator-heat receptor means comprises a layer of felt.

3. The apparatus of claim 1 in which said evaporator-heat receptor means comprises a layer of particulate matter.

4. The apparatus of claim 3 in which said particulate matter comprises charcoal.

5. The apparatus of claim 3 in which said particulate matter comprises sand.

6. The apparatus of claim 3 in which said particulate matter comprises cinders.

7. The solar still of claim 1 in which said passage means are spaced apart a sufficient distance to maintain adequate insulation of said evaporator-heat receptor means from said bulk brine distilland and not exceeeding a distance within which there is maintained the aforesaid countercurrent flow of brine.

8. The apparatus of claim 1 in which said particulate filling material is supported by a screen.

9. The apparatus of claim 1 in which said particulate filling material is admixed with a binder.

10. In a solar still for evaporating brine for the recovery of potable values from a body of brine, said still comprising a light transmitting canopy having a wettable inner surface adapted to the formation of condensate thereon and gravity influenced flow of said condensate to means for condensate collection, the improvement comprising:
  spaced wall means contacting said brine and forming a water seal therewith for supporting said canopy and defining a pool of said body of brine, said wall means comprising buoyant members sufficient to flotationally support the said still in the said body of brine;
  buoyant brine-impervious slab means for floating on the surface of said pool of brine and substantially covering said pool for thermally insulating said brine, said slab means being spaced apart over the surface of the said pool of brine;
  a brine-wettable evaporator-heat receptor means supported on said slab means for converting incident solar radiatnt energy into heat and evaporating brine wet therewith, and
  means comprising fibrous particulate filling material disposed in contact with said slab means and communicating with said evaporator-heat receptor means and the said pool of brine, said fibrous particulate filling material comprising vertical interconnecting passageways for providing capillary active means for supplying said brine to said evaporator-heat receptor means to keep it wetted and provide a counterflow of concentrated brine to prevent salt deposition in said evaporator-heat receptor means.

11. The apparatus of claim 10 in which said means for condensate collection includes a distensible bladder submerged in the said body of brine.

References Cited

UNITED STATES PATENTS

| | | | |
|---|---|---|---|
| 1,812,516 | 6/1931 | Dooley | 202—234 |
| 2,412,466 | 12/1946 | Miller et al. | 202—234 |
| 2,455,835 | 12/1948 | Ushakoff | 202—234 |
| 2,820,744 | 1/1958 | Lighter | 203—10 X |
| 3,072,920 | 1/1963 | Yellott | 4—172 |
| 3,138,546 | 6/1964 | Muller. | |
| 3,282,327 | 11/1966 | Hardy et al. | 159—47 |
| 3,314,862 | 4/1967 | Hay | 203—10 |

OTHER REFERENCES

International Symposium on Water Distillation, October 1965, pp. 1, 4 and 5.

NORMAN YUDKOFF, Primary Examiner

F. E. DRUMMOND, Assistant Examiner

U.S. Cl. X.R.

202—234; 203—10